United States Patent
Liao et al.

(10) Patent No.: US 8,089,902 B1
(45) Date of Patent: Jan. 3, 2012

(54) SERIAL ATTACHED SCSI BROADCAST PRIMITIVE PROCESSOR FILTERING FOR LOOP ARCHITECTURES

(75) Inventors: Heng Liao, Belcarra (CA); Kuan Hua Tan, Burnaby (CA); Larrie Simon Carr, Anmore (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 1129 days.

(21) Appl. No.: 11/326,508

(22) Filed: Jan. 6, 2006

Related U.S. Application Data

(60) Provisional application No. 60/641,778, filed on Jan. 7, 2005.

(51) Int. Cl.
*H04L 12/28* (2006.01)
(52) U.S. Cl. ...................................................... 370/254
(58) Field of Classification Search .................. 370/254, 370/216, 222, 223, 224, 293, 351, 404, 424, 370/452, 460
See application file for complete search history.

(56) References Cited

U.S. PATENT DOCUMENTS

| | | | |
|---|---|---|---|
| 5,570,366 A | 10/1996 | Baker et al. | |
| 5,903,769 A * | 5/1999 | Arya | 712/5 |
| 5,920,699 A | 7/1999 | Bare | |
| 6,192,054 B1 * | 2/2001 | Chan et al. | 370/452 |
| 6,556,575 B1 | 4/2003 | Denio et al. | |
| 7,010,607 B1 * | 3/2006 | Bunton | 709/228 |
| 7,334,075 B2 * | 2/2008 | Marushak et al. | 710/316 |
| 2005/0138221 A1 * | 6/2005 | Marushak | 710/1 |
| 2006/0101171 A1 * | 5/2006 | Grieff et al. | 710/36 |

* cited by examiner

*Primary Examiner* — Dang Ton
*Assistant Examiner* — Nourali Mansoury
(74) *Attorney, Agent, or Firm* — Mukundan Chakrapani Borden Ladner Gervais LLP

(57) ABSTRACT

A method and system are provided for broadcast message filtering in SAS expanders. Common SAS topology defined by ANSI T10 specification only supports spanning tree topology (without loops) interconnection among multiple end devices and expander devices. Broadcast message filtering provides a mechanism to selectively discard broadcast messages, or primitives, in the SAS expanders to break the infinite loop path that broadcast primitives can traverse. This enables new SAS physical topologies with loops that are otherwise difficult or impossible to realize using SAS expanders that handle primitive broadcasts according to the definition of the SAS standard. By allowing redundant paths in a SAS topology, the problem of infinite broadcast flooding in SAS topology is reduced. Selectively forwarding broadcast messages can be based on whether the broadcast was originated at the source phy, or received by the source phy, or based on whether the source phy is a filtered phy.

17 Claims, 10 Drawing Sheets

SERIAL ATTACHED SCSI BROADCAST PRIMITIVE PROCESSOR FILTERING FOR LOOP ARCHITECTURES

CROSS REFERENCE TO RELATED APPLICATIONS

This application claims the benefit of priority of U.S. Provisional Patent Application No. 60/641,778 filed on Jan. 7, 2005, which is incorporated herein by reference.

FIELD OF THE INVENTION

The present invention relates generally to protocols relating to the physical interconnection of storage devices. More particularly, the present invention relates to the Serial Attached Small Computer System Interface protocol and broadcast primitives used in conjunction with that protocol.

BACKGROUND OF THE INVENTION

Serial Attached SCSI (SAS) protocol specifies a protocol stack that provides serial physical interconnect that can be used to connect storage devices such as Hard Disk Drive (HDD) host devices together. It specifies the transport layer protocols to transport SCSI commands, serial ATA (advanced technology attachment) commands and management commands among storage devices. The protocol is intended to be used in conjunction with SCSI and ATA command sets.

The SAS protocol defines the function of an SAS expander device, which is part of the service delivery subsystem and facilitates communication between SAS devices. The switching matrix in a Serial Attached SCSI domain is called an expander, which also provides routing functions. Devices connect to an expander across physical links attached to ports on the device and the expander. In SAS, a physical link is typically a set of four signal lines used as two differential pairs. A "phy" is a transceiver that electrically interfaces with a physical link combined with the portions of the protocol that encode data and manage the reset sequences. A port is created when one or more phys share the same address and attach to a device through one or more physical links.

Multiple SAS end devices and SAS expander devices can be connected together to form a SAS topology. There can be one or multiple physical links connecting each pair of neighbouring devices. When there is a single physical link between two devices, the associated phy on the SAS device is called a narrow port. When there are multiple physical links connecting two devices, the associated phys on an expander are considered to be a wide port. In other words, all links of a wide port are considered to form a common logical link from a routing perspective, although it allows multiple simultaneous connections to pass through the wide port at the same time.

The SAS protocol uses primitive broadcasts to communicate asynchronous events amongst SAS devices. A primitive is fundamentally different from a packet. A packet is typically a multi-byte data structure containing some type of code for delineation of start of packet and end of packet, a header containing address information, data payload and checksum. A broadcast primitive allows different types of messages, with the most common approach in SAS having eight different types of messages, or special control Dwords, that are transmitted into the physical link to communicate up to 8 types of asynchronous events such as topology change. Except for an identification of the type of event, the broadcast primitive does not carry any additional information such as source address, destination address, or time to live.

When a SAS expander receives a broadcast primitive, the primitive is propagated to all the phys of the expander except for the phys on the port that the original broadcast primitive was received from. When an end device receives a broadcast primitive, it notifies the upper layer of the occurrence of the asynchronous event as indicated by the primitive type, but does not propagate the primitive to other physical phys. Thus, whenever a broadcast primitive gets injected to a SAS topology, the primitive will propagate to all devices connected by the topology, including all end devices and expander devices.

An example of SAS topology having a loop is shown in FIG. 1. In this example, the topology contains two levels of expander hierarchies. Two host devices 102 and 104 are connected to expanders 106 and 108, respectively, at the first level of hierarchy. Both expanders 106 and 108 are connected to all three expanders 110, 112 and 114 at the second level hierarchy. Target devices 116 through 126 are connected to one of the three expanders in the second level. The purpose of such a topology is to provide redundancy to protect the system from failures at the first level of the hierarchy. For example, in case of failure of Expander 106, Host 104 can still get access to all target devices through Expander 108.

In FIG. 1, expanders 106 and 108 provide a backplane, while the next level expanders 108, 110 and 112 provide a blade. Multiple disks are attached within the blade.

The dotted line path in FIG. 1 shows one of the loop paths in this topology. Consider a scenario where target 116 loses the physical link to expander 110 Phy 2. Expander 110 Phy2 will detect loss of Dword synchronization and will originate a BROADCAST(CHANGE) primitive, or simply broadcast change primitive. According to standard SAS processing, Expander 110 will send broadcast primitive to all phys except Phy2. In a second step, a broadcast change primitive will be received by Expander 108 Phy1. This causes Expander 108 to send a broadcast change primitive to all phys except Phy1. In a third step, a broadcast change primitive arrives at Expander 112 Phy1, which again propagates the broadcast change primitive to all phys except Phy1.

In a fourth step, the broadcast change primitive is received by Expander 106. Expander 106 sends a broadcast change primitive to all phys except Phy2. Now the broadcast change primitive has got back to Expander 110. Expander 110 will send out a broadcast change primitive again to all phys except Phy0. As shown here, the broadcast change primitive will circulate the loop path continuously and generate a broadcast change primitive on all other phys as it passes through each expander. The broadcast change primitive will flood the entire topology and stay that way indefinitely causing all link bandwidth to be consumed by the broadcast change primitive. The end result is the link bandwidth on the entire topology is consumed by infinite repetition of the broadcast primitive making the topology unusable for transporting data or control traffic. In summary, having a loop in SAS topology causes infinite broadcast storm.

With this in mind, the SAS standard requires that a legal SAS topology cannot contain a loop. In other words, there can be only one logical path (considering all links of a wide port to be a single link) to traverse the topology from any of the devices to any other device. Under such constraints the only type of topology allowed by SAS specification is a tree topology.

A spanning tree of switches used in Ethernet is similar to the required topology of expanders in the SAS standard, i.e. the topology must be loopless. A Bridge Protocol Data Unit (BPDU) in Ethernet is part of the spanning tree protocol that helps describe and identify attributes of a switch port. BPDUs allow for switches to obtain information about each other. If there is any loop in a spanning tree topology, during the topology discovery a BPDU is issued to exchange topology information among switches.

Once a loop is detected in a spanning tree, the switch elects one port to be disabled for all traffic. Therefore, if there is a loop in a spanning tree algorithm based on Ethernet addresses, it identifies a link elected for breakage, i.e. a link that will be entirely disabled. In FIG. 2, this link is identified as 128. Once this link 128 is disabled, it is not only disabled for broadcast traffic but it is disabled for all traffic, as illustrated in FIG. 2.

In the broader field of communications networks, conventional approaches involving broadcast filtering are represented by the following public domain publications, incorporated by reference in their entirety: U.S. Pat. No. 6,556,575 issued Apr. 29, 2003 to Denio et al.; U.S. Pat. No. 5,570,366 issued Oct. 29, 1996 to Baker et al.; U.S. Pat. No. 5,920,699 issued Jul. 6, 1999 to Ballard; Serial Attached SCSI standard revision 1 and revision 1.1; and 802.1D Spanning tree protocol.

Most known techniques teach a filtering method based on packet header information that does not exist in a SAS primitive, hence they can not be applicable or be extended to handle SAS primitive broadcast filtering. Moreover, these conventional techniques do not address the problem of primitive broadcast processing in SAS. Since SAS topologies defined by the SAS standard do not allow for a loop to exist, the problem simply does not exist in a standard compliant SAS environment.

Despite the constraint of the SAS protocol, certain applications demand a redundant path, or a loop, to be supported in the interconnection topology using SAS protocol. Primitive broadcast processing is a challenge in such an environment.

It is, therefore, desirable to provide an approach that solves the broadcast storm problem in SAS topologies with loops.

SUMMARY OF THE INVENTION

It is an object of the present invention to obviate or mitigate at least one disadvantage of previous SAS topologies and SAS Expander devices.

Embodiments of the present invention address the broadcast filtering issue in SAS topology and SAS Expander devices. However, the same concept can be applied to handle port/phy based broadcast filtering in other types of non-SAS communications networks. According to embodiments of the present invention, the type of broadcast object handled would no longer be considered a primitive, but another type of broadcast message, such as a packet, frame or signal.

In an aspect, there is provided a device for selective broadcast message filtering in a topology having a loop and including a plurality of expander phys. The device includes a traffic discriminator to determine whether received traffic is data traffic or broadcast traffic. The device also includes a filtered broadcast message processor to forward all received data traffic and to selectively send received broadcast traffic to a subset of the plurality of expander phys based on knowledge of the location of the loop in the topology.

The filtered broadcast message processor can include means to selectively send broadcast traffic based on a set of filtering rules and a configuration status. The device can include means to process received broadcast messages in a different manner than originated broadcast messages. The device can include means to check a broadcast message to determine if it was originated internally from a source phy or was received externally by the source phy. The device can include means to process broadcast messages received from a filtered phy in a different manner than broadcast messages received from a non-filtered phy.

The filtered broadcast message processor can include an identification of filtered phys and non-filtered phys, which can be independent of broadcast message contents.

In an embodiment, filtered broadcast message processor includes: means to forward received broadcast messages to all non-filtered phys that are not part of a source port; and means to forward originated broadcast requests to all phys that are not part of the source port.

In another embodiment, the filtered broadcast message processor includes: means to forward broadcast messages received from filtered phys to all non-filtered phys that are not part of a source port; means to forward broadcast messages received from non-filtered phys to all phys that are not part of the source port; and means to forward originated broadcast requests to all phys that are not part of the source port.

In a further embodiment, the filtered broadcast message processor includes: means to discard broadcast messages received from filtered phys; means to forward broadcast messages received from non-filtered phys to all phys that are not part of a source port; and means to forward originated broadcast requests to all phys that are not part of the source port.

The device can further include: a source phy map vector identifying phys belonging to the same wide port as a source phy; a target phy map vector identifying target phys, the target phy map vector being the inverse of the source phy map vector, and a destination phy map vector identifying broadcast destination phys after filtering. In response to an originated broadcast message, the destination phy map vector can be set to be the same as the target phy map vector. In response to a received broadcast message, the destination phy map vector can be determined based on a masking of the target phy map vector with an identification of the filtered phys.

The device can include a mask register to store the identification of the filtered phys, which can comprise an N bit vector, where N is the number of expander phys. The filtered broadcast message processor can include a filtered broadcast primitive processor interface to maintain standard request and indication interfaces with expander phys. The device can be a serial attached SCSI (SAS) device.

In another aspect, the present invention provides a method of selective broadcast message transmission. The method includes the following steps: determining whether a broadcast message is a received broadcast message or an originated broadcast message; and selectively forwarding the broadcast message based on the determination of broadcast message type.

The broadcast message can be transmitted by a source phy. The step of determining can include checking the broadcast message to determine if it was originated internally from a source phy or was received externally by the source phy.

The step of selectively forwarding can be based on a set of filtering rules and a configuration status. The step of selectively forwarding can include processing broadcast messages received from a filtered phy in a different manner than broadcast messages received from a non-filtered phy.

In an embodiment, the step of selectively forwarding includes: forwarding received broadcast messages to all non-filtered phys that are not part of a source port; and forwarding originated broadcast requests to all phys that are not part of the source port.

In another embodiment, the step of selectively forwarding includes: forwarding broadcast messages received from filtered phys to all non-filtered phys that are not part of a source port; forwarding broadcast messages received from non-filtered phys to all phys that are not part of the source port; and forwarding originated broadcast requests to all phys that are not part of the source port.

In a further embodiment, the step of selectively forwarding includes: discarding broadcast messages received from filtered phys; forwarding broadcast messages received from non-filtered phys to all phys that are not part of a source port; and forwarding originated broadcast requests to all phys that are not part of the source port.

The step of selectively forwarding can include the following steps: determining a source phy map vector identifying phys belonging to the same wide port as a source phy; generating a target phy map vector identifying target phys by taking the inverse of the source phy map vector, generating a destination phy map vector identifying broadcast destination phys after filtering; and selectively forwarding the broadcast message to each phy in the destination phy map.

The step of generating the destination phy map vector can include, in response to an originated broadcast message, setting the destination phy map vector to be the same as the target phy map vector. The step of generating the destination phy map vector can include, in response to a received broadcast message, determining the destination phy map vector based on a masking of the target phy map vector with an identification of the filtered phys.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for broadcast message filtering in SAS expanders. Common SAS topology defined by ANSI T10 specification only supports spanning tree topology (without loops) interconnection among multiple end devices and expander devices. Broadcast message filtering provides a mechanism to selectively discard broadcast messages, or primitives, in the SAS expanders to break the infinite loop path that broadcast primitives can traverse. This enables new SAS physical topologies with loops that are otherwise difficult or impossible to realize using SAS expanders that handle primitive broadcasts according to the definition of the SAS standard. By allowing redundant paths in a SAS topology, the problem of infinite broadcast flooding in SAS topology is reduced. Selectively forwarding broadcast messages can be based on whether the broadcast was originated at the source phy, or received by the source phy, or based on whether the source phy is a filtered phy.

Embodiments of the present invention address the broadcast filtering issue in SAS topology and SAS Expander devices. However, the same concept can be applied to handle port/phy based broadcast filtering in other types of non-SAS communications networks. According to embodiments of the present invention, the type of broadcast object handled would no longer be considered primitives, but other types of broadcast packets, frames or signals.

The ability to implement redundant paths in any SAS topology is very useful in any kind of Computing Server or Storage system that demands high availability. The Redundant paths enable Server and Storage systems to incorporate redundant hot-replaceable modules in the topology to achieve high reliability and high availability. The same SAS topology can be applied to any kind of storage model including Direct Attached Storage (DAS), Network Attached Storage (NAS) or Storage Area Network (SAN) models.

The application of embodiments of the present invention in other types of communications networks provides similar benefits to those communications networks: high availability and high bandwidth by enabling redundant paths in the network topologies.

The goal is to be able to have a loop topology in SAS and to selectively propagate broadcast messages.

Three methods described according to embodiments of the present invention provide variations on reducing broadcast data traffic in an SAS topology. The approach of the present invention is different from an Ethernet approach; for example, every port can belong to a virtual LAN or VLAN. If a message is received from a certain virtual LAN you only propagate the message to ports belonging to that same virtual LAN.

Figure 3:
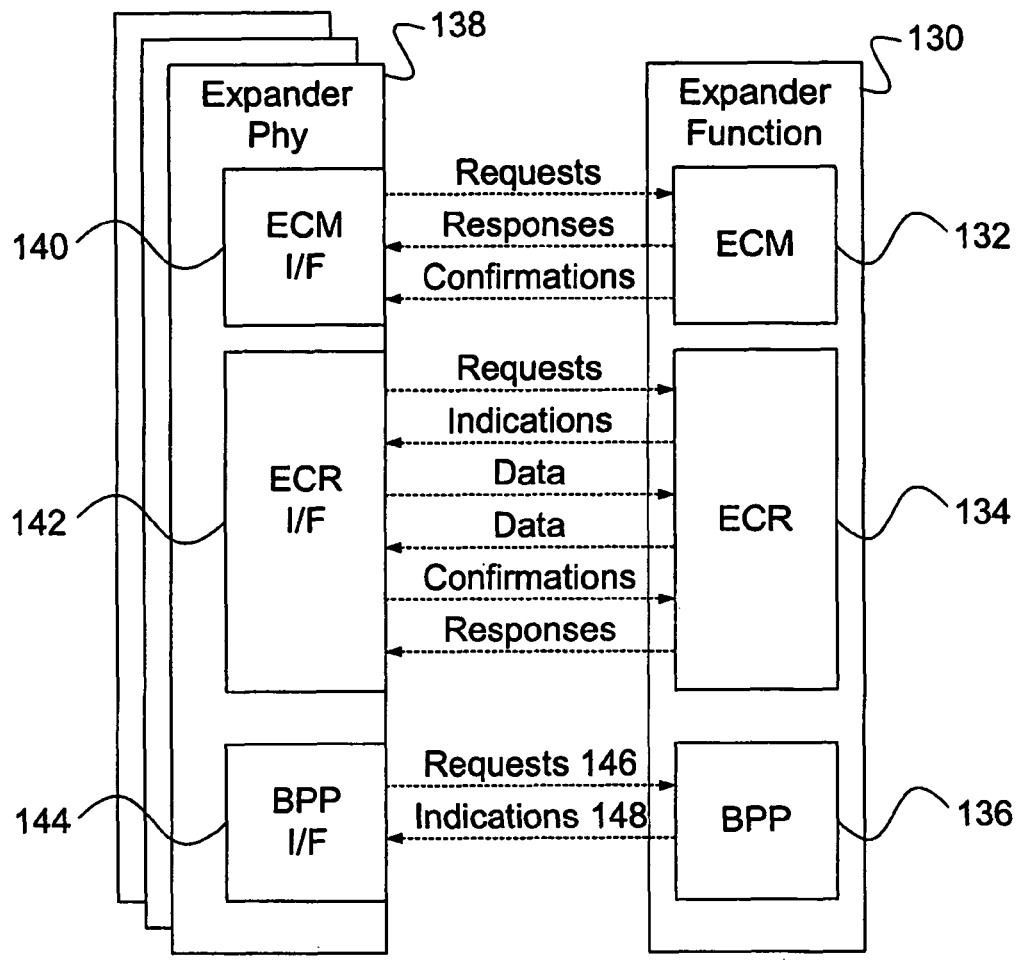
FIG. 3 illustrates conventional SAS expander functional blocks.

FIG. 3 illustrates expander functions defined by the SAS standard. A typical expander 130 includes an expander connection manager (ECM) 132, an expander connection router (ECR) 134, the BPP 136 and a number of phys. Each phy 138 includes ECM interface 140, ECR interface 142 and BPP interface 144. Embodiments of the present invention involve a subset of the functional blocks and control signals including the BPP interface 144, the BPP 136, and transmission of BPP Requests 146 and BPP indications 148 between the BPP and BPP interface.

Figure 4:
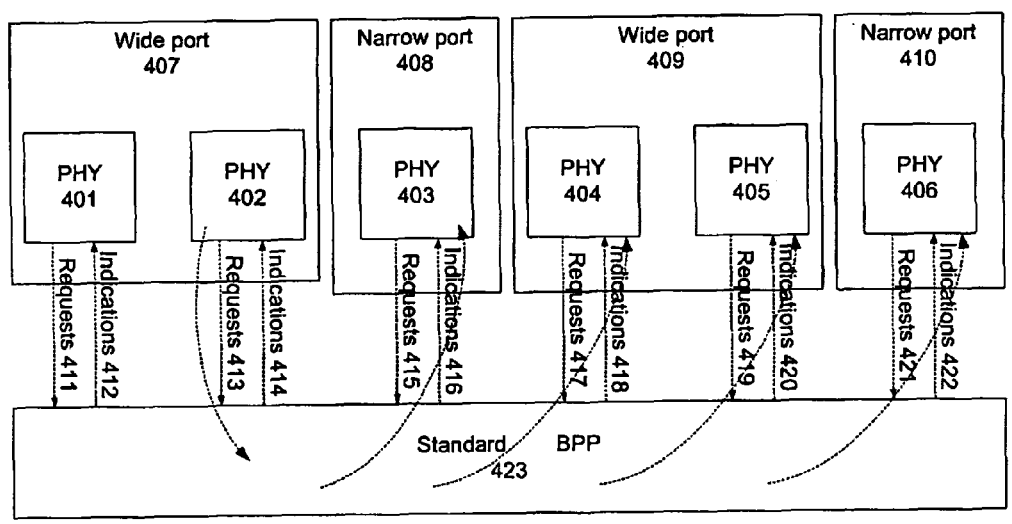
FIG. 4 illustrates conventional standard based BPP broadcast processing.

Conventional BPP functionality defined by SAS standard, or how an expander interacts with a known standard-based BPP, is illustrated in FIG. 4. Whenever a BPP request is received from a phy, the BPP sends corresponding BPP transmit indications to all phys of the expander except for the phys that belong to the source port. In this example, a broadcast request is received from phy 402 belonging to wide port 407. The BPP 423 sends broadcast transmit indications to phys 403, 404, 405, 406 since these phys do not belong to the source port 407, but it does not send broadcast transmit indications to phys 401 and 402 because they belong to the source port 407.

The present invention can be described as selectively sending a broadcast message based on a set of filtering rules and on a configuration status. The filtering rules can be any of the steps in each of the sets of methods according to embodiments of the present invention. The configuration status can include the contents of a BPP inhibit vector.

In contrast to known methods such as those used in Ethernet, methods according to the present invention are static methods based on the assumption that the network designer knows where to break the loop. As such, the process of electing which link to break is eliminated. Secondly, the way that transmission of broadcast messages is limited is based on, or dependent on, the definition of disabled ports (or filtered ports), in a manner that has no effect on how the data traffic is propagated. Therefore, broadcast traffic is treated differently and separately from data traffic. This is a primary difference when comparing methods of the present invention to the Ethernet approach, which totally disables a link for all types of traffic. Even in VLAN approaches, there is the same effect of limiting both broadcast and data traffic across a certain boundary.

Figure 5:
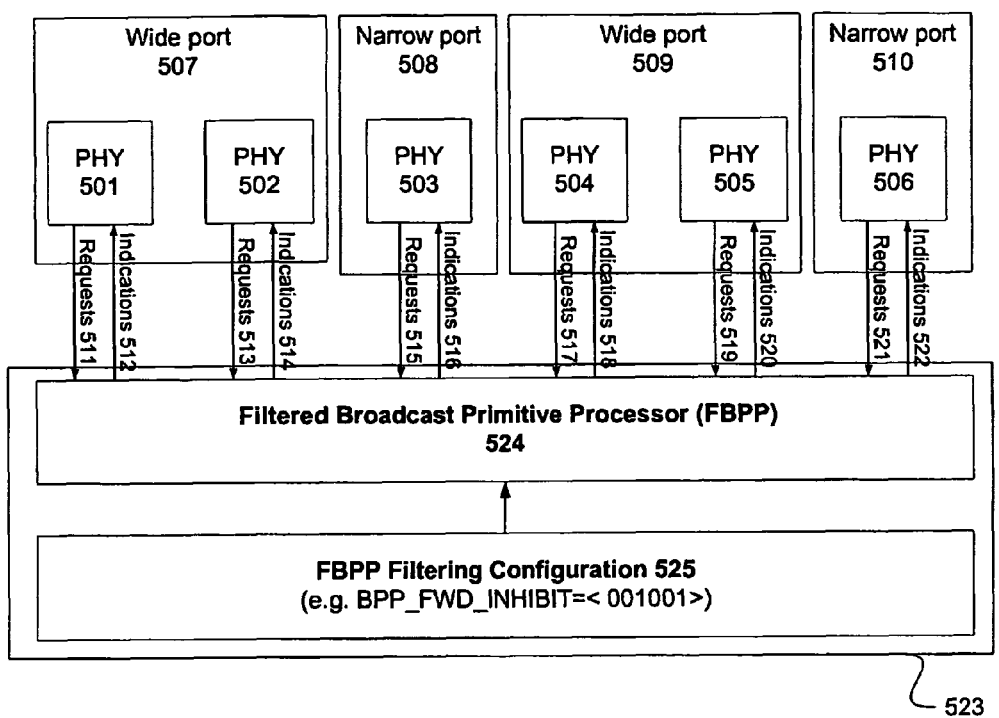
FIG. 5 is a block and flow diagram showing an SAS device including a filtered broadcast message processor according to an embodiment of the present invention.

FIG. 5 is a block and flow diagram showing an SAS device including a filtered broadcast message processor 523 according to an embodiment of the present invention. Similar reference numerals are used in FIG. 4 as were used in FIG. 4. The filtered broadcast message processor 523 selectively sends a broadcast message based on a set of filtering rules and on a configuration status. The filtered broadcast message processor does not have any effect on data traffic propagation. In other words, broadcast messages are selectively broadcast (or selectively filtered), whereas data traffic is unfiltered. In the embodiment shown in FIG. 5, the filtered broadcast message processor 523 includes a filtered broadcast primitive processor (FBPP) 524. The FBPP 524 implements a broadcast filtering function, while preferably maintaining the same request and indication interfaces with the expander phys. This filtering function is preferably performed based on a FBPP filtering configuration 525, which can be implemented as a BPP_FWD_INHIBIT mask register. In other words, referring to the embodiment of FIG. 5, the filtering function can be described as being under the control of the BPP_FWD_INHIBIT mask register 525. This diagram shows an example based on a first method according to an embodiment of the present invention where the BPP_FWD_INHIBIT mask has the value of <001001> with each bit corresponding to phy 501 through phy 506.

In other words, an embodiment of the present invention provides a device for selective broadcast message filtering in a topology having a loop and including a plurality of expander phys. The device includes a traffic discriminator to determine whether received traffic is data traffic or broadcast traffic. The device also includes a filtered broadcast message processor to forward all received data traffic and to selectively send received broadcast traffic to a subset of the plurality of expander phys based on knowledge of the location of the loop in the topology. The traffic discriminator can typically be physically implemented as part of the filtered broadcast message processor.

The filtered broadcast primitive processor can include the rules upon which the methods of the present invention will be executed. These rules can be stored in software, hardware, firmware, or any combination thereof. The filtered broadcast message processor 523, preferably including the combination of the filtered broadcast primitive processor and the FBPP filtering configuration, i.e. the inhibit vector, in FIG. 5 replaces the standard BPP of FIG. 4.

A filtered broadcast message processor according to an embodiment of the present invention can include means to selectively send broadcast traffic based on a set of filtering rules and a configuration status. The device can include means to process received broadcast messages in a different manner than originated broadcast messages. The device can include means to check a broadcast message to determine if it was originated internally from a source phy or was received externally by the source phy. The device can include means to process broadcast messages received from a filtered phy in a different manner than broadcast messages received from a non-filtered phy.

The filtered broadcast message processor can include an identification of filtered phys and non-filtered phys, which can be independent of broadcast message contents.

The device can include a mask register to store the identification of the filtered phys, which can comprise an N bit vector, where N is the number of expander phys. The filtered broadcast message processor can include a filtered broadcast primitive processor interface to maintain standard request and indication interfaces with expander phys. The device can be a serial attached SCSI (SAS) device.

Figure 6:
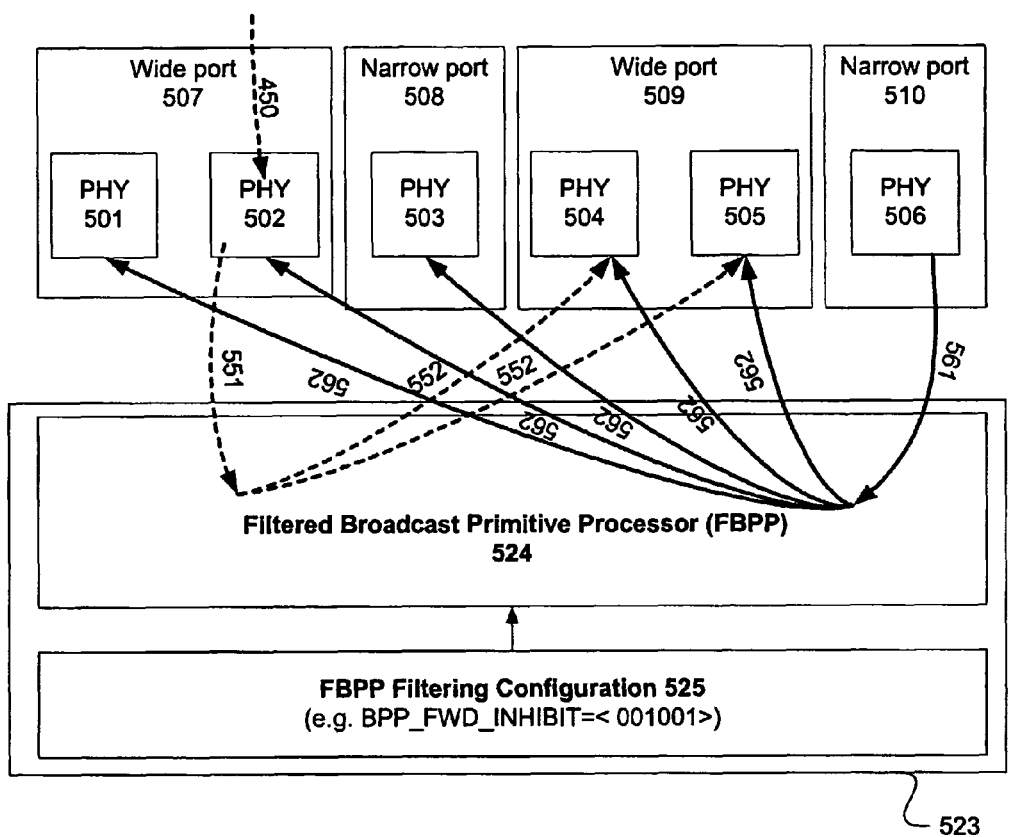
FIG. 6 is a block and flow diagram showing a broadcast operation with an SAS device including a filtered broadcast message processor according to an embodiment of the present invention.

Two sets of broadcast operations are illustrated in FIG. 6. As shown in dotted curved lines, in step 550 a first broadcast message is sent to phy 502. In step 551, the first broadcast is received from phy 502. In subsequent step 552, FBPP sends Transmit Broadcast indications to all phys except for the phys that belong to the source port and the phys that have BPP_FWD_INHIBIT bit set, which in this case means phys 504 and 505. This first example illustrates selective broadcast message filtering based on destination phy.

As shown in solid curved lines, in step 561a second broadcast request is originated from phy 506 due to physical link loss of Dword synchronization. The FBPP does not deviate from the SAS standard defined behaviour. In step 562, it simply sends Transmit Broadcast Indications to all phys except the phys belonging to the source port: phys 501, 502, 503, 504, and 505. This second example illustrates selective broadcast message filtering based on broadcast message type.

An embodiment of the present invention uses the combination of FBPP and the BPP_FWD_INHIBIT mask register to selectively filter out some broadcast primitives based on the destination phy as well as the type of broadcast requests. The details of the filtering mechanism are described later.

There are a number of BPP Transmit Indications and BPP Requests defined by the SAS Standard. Table 1 lists all the BPP Transmit indications and example encoding for the all types of BPP transmit indications.

TABLE 1

| BPP_Indication[2:0] | BROADCAST Primitive Transmit Indication |
|---|---|
| b000 | Transmit Broadcast Primitive: BROADCAST (CHANGE) |
| b001 | Transmit Broadcast Primitive: BROADCAST (RESERVED CHANGE 0) |
| b010 | Transmit Broadcast Primitive: BROADCAST (RESERVED CHANGE 1) |
| b011 | Transmit Broadcast Primitive: BROADCAST (SES) |
| b100 | Transmit Broadcast Primitive: BROADCAST (RESERVED 1) |
| b101 | Transmit Broadcast Primitive: BROADCAST (RESERVED 2) |
| b110 | Transmit Broadcast Primitive: BROADCAST (RESERVED 3) |
| b111 | Transmit Broadcast Primitive: BROADCAST (RESERVED 4) |

Table 2 lists all the BPP Requests types and example encoding.

TABLE 2

| BPP_REQ [3:0] | Description | Source of Request |
|---|---|---|
| b0000 | Broadcast Event Notify (BROADCAST CHANGE received). Request to transmit BROADCAST (CHANGE) on all other ports because the PHY has received a BROADCAST (CHANGE) primitive. | Received |
| b0001 | Broadcast Event Notify (BROADCAST RESERVED CHANGE 0 received). Request to transmit BROADCAST (RESERVED CHANGE 0) on all other ports because the PHY has received a BROADCAST (RESERVED CHANGE 0) primitive. | Received |
| b0010 | Broadcast Event Notify (BROADCAST RESERVED CHANGE 1 received). Request to transmit BROADCAST (RESERVED CHANGE 1) on all other ports because the PHY has received a BROADCAST (RESERVED CHANGE 1) primitive. | Received |
| b0011 | Broadcast Event Notify (BROADCAST SES received). Request to transmit BROADCAST (SES) on all other ports because the PHY has received a BROADCAST (SES) primitive. | Received |
| b0100 | Broadcast Event Notify (BROADCAST RESERVED 1 received). Request to transmit BROADCAST (RESERVED 1) on all other ports because the PHY has received a BROADCAST (RESERVED 1) primitive. | Received |
| b0101 | Broadcast Event Notify (BROADCAST RESERVED 2 received). Notification that a BROADCAST (RESERVED 2) primitive has been detected. | Received |
| b0110 | Broadcast Event Notify (BROADCAST RESERVED 3 received). Notification that a BROADCAST (RESERVED 3) primitive has been detected. | Received |
| b0111 | Broadcast Event Notify (BROADCAST RESERVED 4 received). Notification that a BROADCAST (RESERVED 4) primitive has been detected. | Received |
| b1000 | Broadcast Event Notify (PHY not ready). Request to transmit BROADCAST (CHANGE) on all other ports because the attached PHY lost Dword synchronization (PL_RDY = '0'). | Originated |
| b1001 | Broadcast Event Notify (SATA Spinup Hold). Request to transmit BROADCAST (CHANGE) on all other ports because the PHY has reached the SATA spin-up hold state (as indicated by the PL_BATA_SPINUP_CONF input pin). | Originated |
| b1010 | Broadcast Event Notify (Identification Sequence Complete). Request to transmit BROADCAST (CHANGE) on all other ports because the PHY has completed the identification sequence (SL_IR state machine). | Originated |
| b1011 | Broadcast Event Notify (Device Configuration Complete). Request to transmit BROADCAST (CHANGE) on all other ports because the PACK has finished configuring the Device. | Originated |
| b11XX | Reserved | Originated |

A technique according to an embodiment of the present invention is agnostic to the actual encoding of the BPP requests and BPP indication signals, so the encodings in these tables are merely provided as examples. The FBPP can use the same interface signals as a normal BPP. All the approaches according to embodiments of the present invention are preferably implemented within the FBPP and the BPP_FWD_INHIBIT registers.

Table 2 classifies the BPP requests into two categories based on the source of Request: Received BPP_REQUEST and Originated BPP_REQUEST. If the phy due to receive a Broadcast Primitive from the line side generates a request, this request is considered to be a Received BPP Request. If a request is generated by a phy due to other conditions that are detected by the phy internally, such as phy loss of Dword synchronization or phy reaching spin up hold state, then this request is considered to be an Originated BPP Request.

Figure 1:
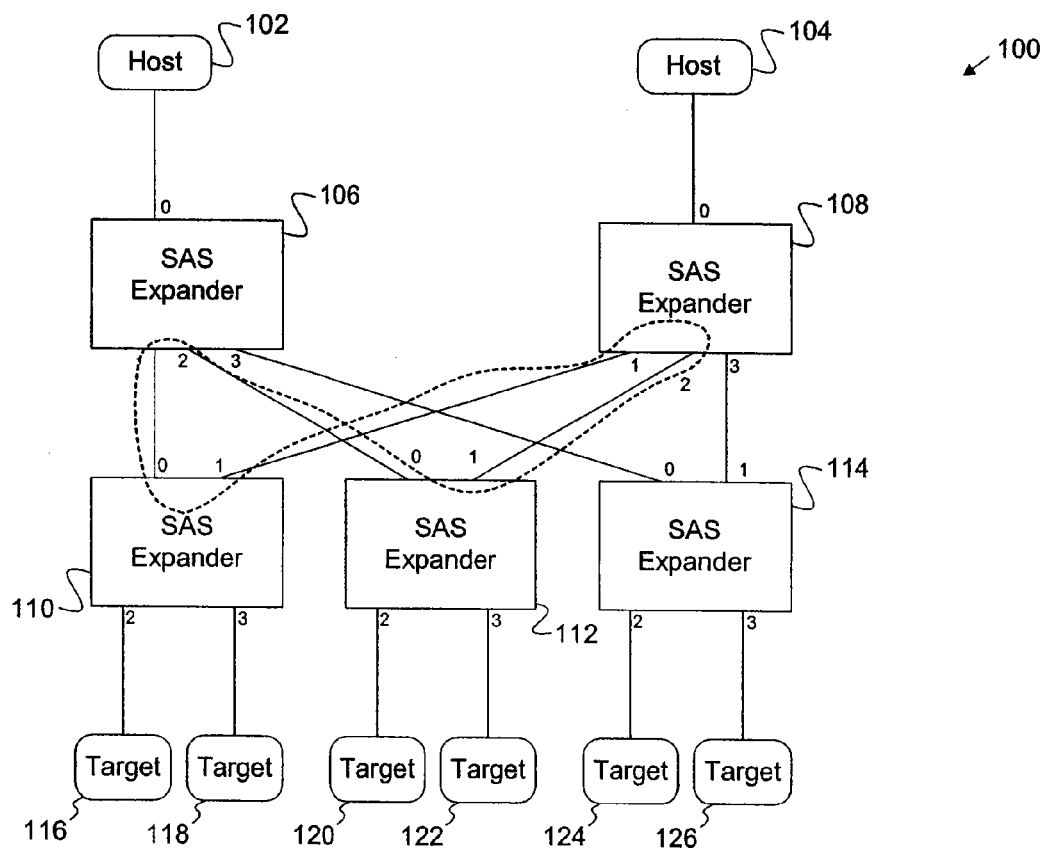
FIG. 1 illustrates a SAS topology with loops.
Figure 2:
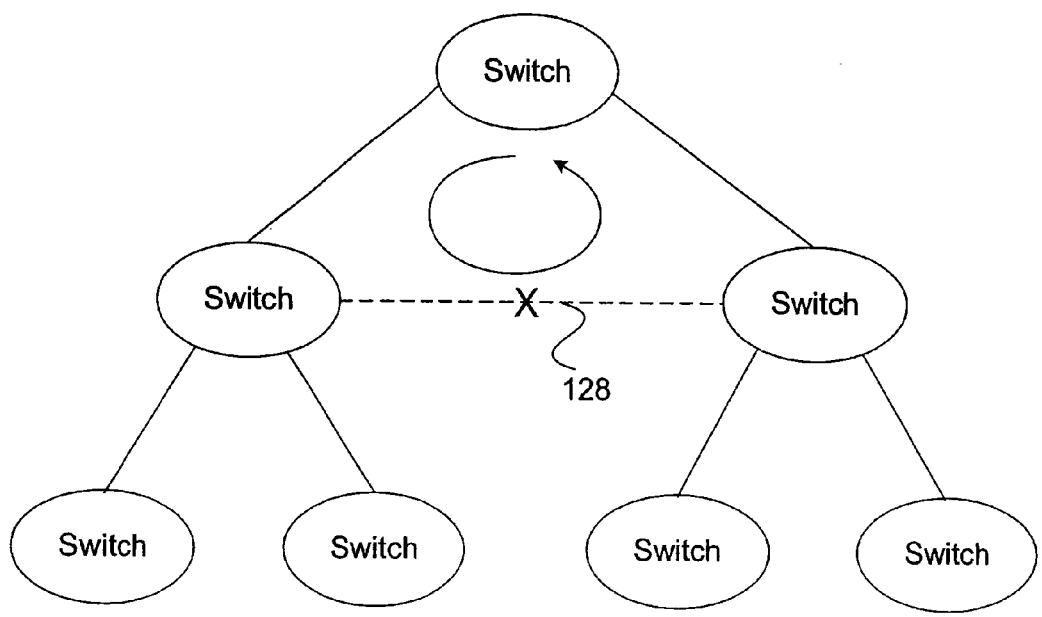
FIG. 2 illustrates a spanning tree topology.

The FBPP handles the BPP requests according to the type of the request and the BPP_FWD_INHIBIT register setting corresponding to the target phys. In an embodiment, the BPP_FWD_INHIBIT is an N-bit vector where N is the number of expander phys. Each bit in the vector corresponds to one expander phy. If a bit in the vector is set to 1, then the corresponding phy is defined as a filtered phy. Otherwise, the corresponding phy is defined as a non-filtered phy. The value of BPP_FWD_INHIBIT is preferably statically assigned by the user, or network designer or administrator. In such a case, the user is responsible for selecting the phys on the Expanders within a topology to apply broadcast filtering function. Normally, all BPP_FWD_INHIBIT bits of the phys within a wide port have the same value. For instance, in FIG. 1, Expander 110 Phy0 and Phy1, Expander 112 Phy0 and Phy1, Expander 114 Phy0 and Phy1 should be configured as filtered Phys to break the loops in the physical topology.

Three examples of methods of implementing the broadcast filtering function according to embodiments of the present invention will now be described. In general, methods of the present invention can be described as a method of selective broadcast message transmission, in a topology having a loop. The method includes the following steps: determining whether a broadcast message is a received broadcast message or an originated broadcast message; and selectively forwarding the broadcast message based on the determination of broadcast message type. The broadcast message can be transmitted by a source phy. The step of determining can include checking the broadcast message to determine if it was originated internally from a source phy or was received externally by the source phy. The step of selectively forwarding can be based on a set of filtering rules and a configuration status. The step of selectively forwarding can include processing broadcast messages received from a filtered phy in a different manner than broadcast messages received from a non-filtered phy.

Figure 7:
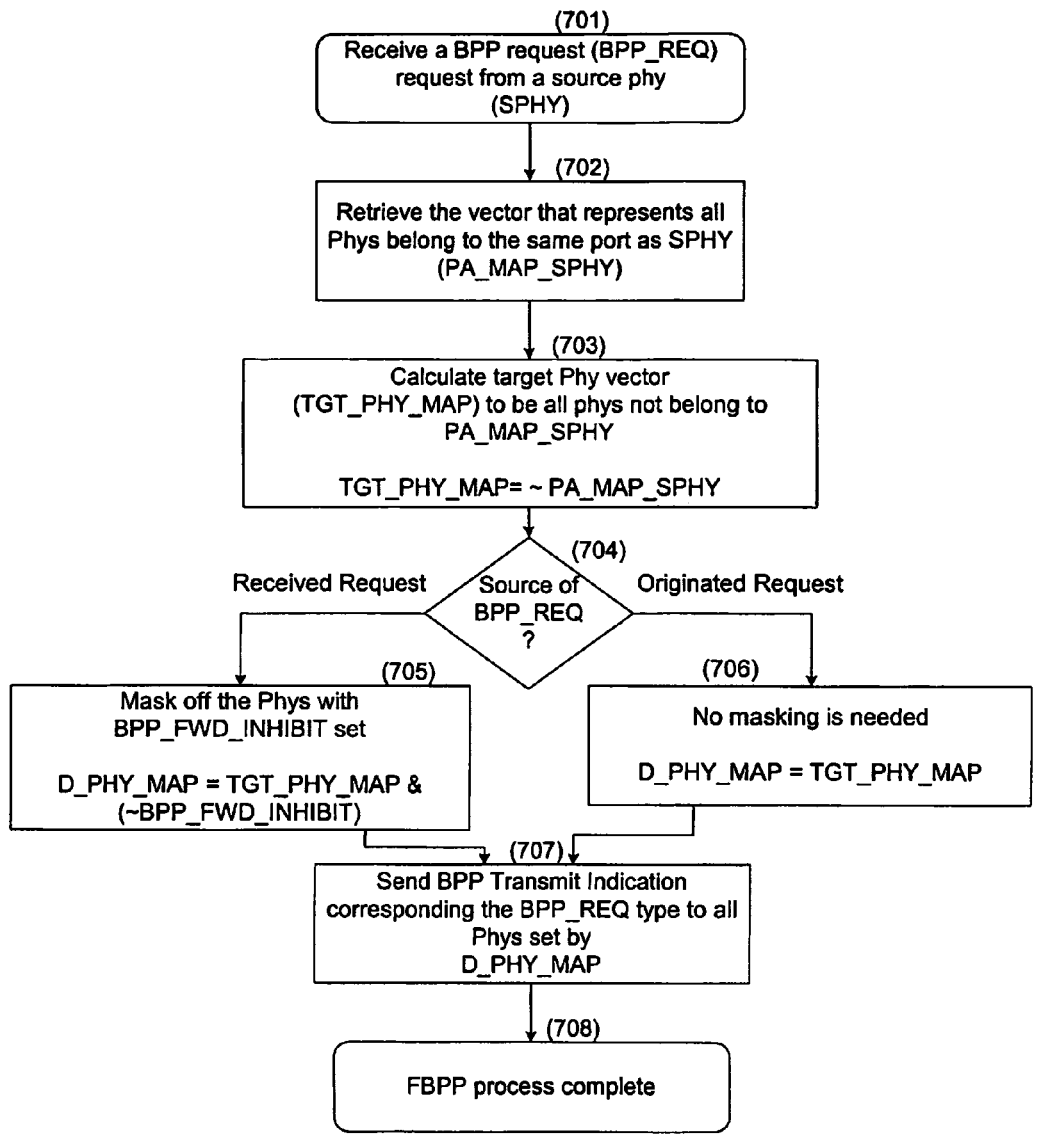
FIG. 7 is a flowchart illustrating a first method according to an embodiment of the present invention.

FIG. 7 illustrates the processing flow for a first method according to an embodiment of the present invention.

In a first method of the present invention, a filter port is defined which prevents any broadcast message from being sent to a certain set of ports. Rather than using a spanning tree algorithm such as in Ethernet, the present invention assumes that an SAS topology is well constrained, i.e. the designer knows where the loops are. As such, it is possible to specify where to break the loop by applying a filter port on the expander, or to the expander.

The method advantageously achieves the following filtering criteria:

1. Received broadcast primitives are only sent to phys that are neither part the source port nor part of the filter ports defined by BPP_FWD_INHIBIT vector.
2. Originated broadcast requests are sent to all phys that are not part of the source port. This can alternatively be described as forwarding received broadcast messages to all non-filtered phys that are not part of the source port, and forwarding originated broadcast requests to all phys that are not part of the source port.

As shown in step 701, The FBPP processing starts by receiving a BPP request (BPP_REQUEST) from a specific source phy (SPHY). At step 702, the FBPP fetches a PA_MAP_SPHY vector from the expander ECM function. Assuming the expander has N ports, this vector preferably comprises the N-wide bitmap for the wide port membership of the SPHY. All the phys belonging to the same wide port as SPHY, including SPHY itself, have the corresponding bit in PA_MAP_SPHY set to 1; other bits in the PA_MAP_SPHY are set to 0. Step 703 calculates the target phy bitmap TGT_PHY_MAP. This bitmap represents the entire set of intended target phys prior to broadcast filtering. The TGT_PHY_MAP equals to the inverse of PA_MAP_SPHY vector.

Step 704 takes a branch according to Source of BPP_REQ. If The BPP_REQ is a "Received request", then step 705 is executed; otherwise, step 706 is executed. In step 705, all the phys defined by BPP_FWD_INHIBIT vector are masked off from the TGT_PHY_MAP to calculate the D_PHY_MAP, which represents the broadcast destination phys after filtering. In step 706, the FBPP does not filter the originated broadcast requests, hence the TGT_PHY_MAP value is assigned to D_PHY_MAP without masking operation. At step 707, the FBPP the BPP transmit indication signals to all the phys represented by the D_PHY_MAP vector.

Therefore, in an embodiment, the present invention provides a method including: forwarding received broadcast messages to all non-filtered phys that are not part of the source port; and forwarding originated broadcast requests to all phys that are not part of the source port.

When implemented as a device, in an embodiment, a filtered broadcast message processor can include: means to forward received broadcast messages to all non-filtered phys that are not part of the source port; and means to forward originated broadcast requests to all phys that are not part of the source port.

Figure 8:
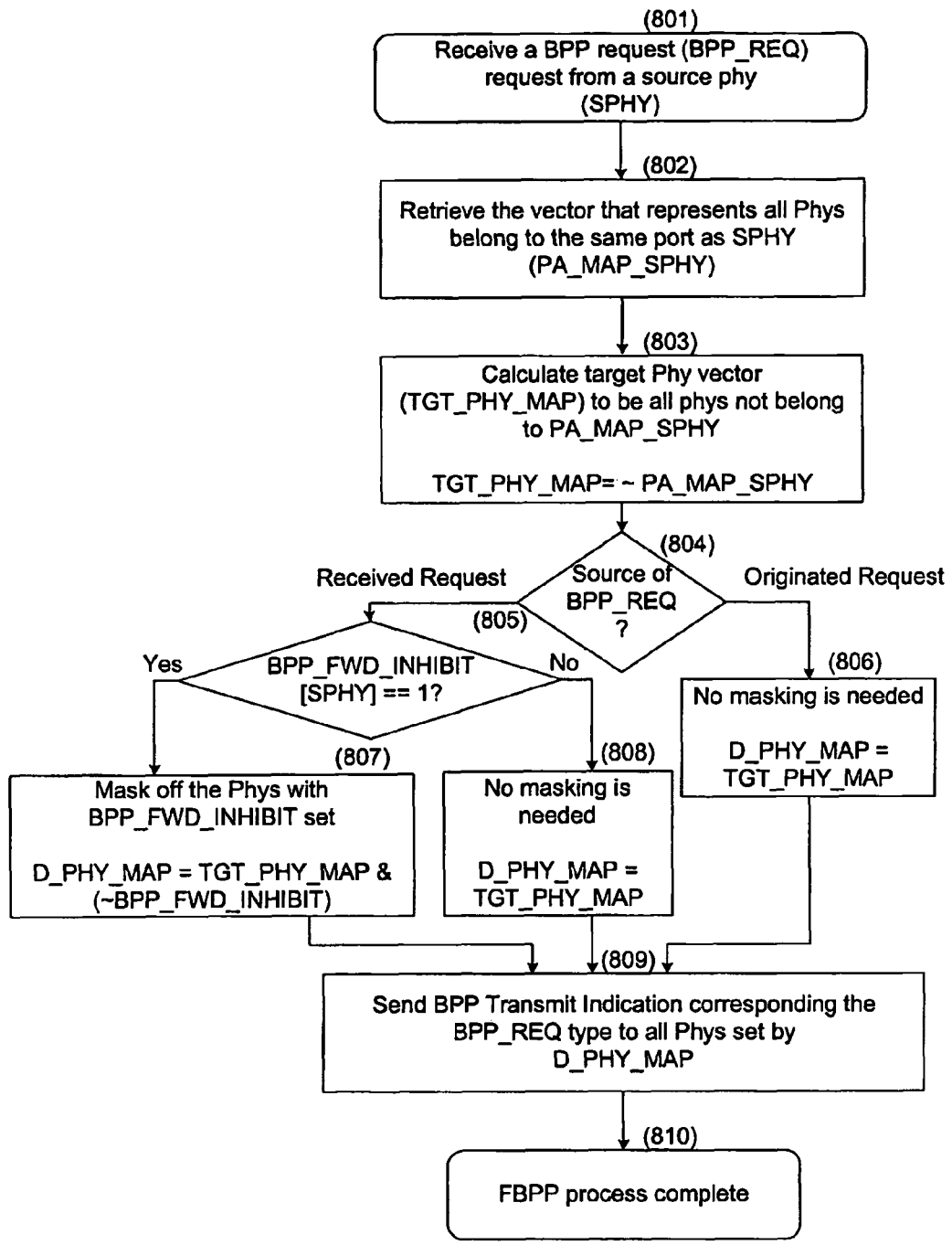
FIG. 8 is a flowchart illustrating a second method according to an embodiment of the present invention.

A second method of FBPP Broadcast filtering according to an embodiment of the present invention is illustrated in the flowchart of FIG. 8.

The first method is used primarily in a topology where a disk and a blade arrangement is connected directly to the expander. As such, any message related to the disk will be an originated message. Therefore, the originated message would be sent to both domains such that any host in a domain is informed of any event that originates at a blade. However, suppose that a message is sent to one of the domains and is received at a different blade. As a result, this will be detected as a received message and will never get propagated back to the other domain, since it is part of a filtered port. Therefore, there are instances in which the first method does not provide for a complete solution.

In a second method, a broadcast message received from the filtered phys as defined by a BPP inhibit vector are only sent to the phys that are neither part of the source port nor part of the filtered phys. The first method filters a received primitive from any port. However, any broadcast primitives originating from that expander are still forwarded.

Therefore, referring to the second method of the present invention, broadcast messages received from the filtered phys as defined by a BPP inhibit vector are only sent to the phys that are neither part of the source port nor part of the filtered phys. In other words, broadcast messages received from filtered phys are forwarded to all non-filtered phys that are not part of the source port. Originated broadcast requests are sent to all phys that are not part of the source port. This step is the same as in the first method. Also, broadcast primitive received from the non-filtered phys as defined by the BPP inhibit vector are forwarded to all phys that are not part of the source port.

This second method is a type of enhancement on the first method, which is useful when a second level of expanders is present in an SAS topology. In such an arrangement, some disks will be directly attached to a first level expander and other disks will be attached to a second level expander, which itself is directly attached to the first level expander. In that situation, the first method will not work properly since a message originated from a disk on the second level expander, once it arrives at a first level expander, will be treated as a received message. Therefore, it will be filtered. However, the intention is that messages from the disks at the second level expander should always be sent to both domains. Therefore, rather than filtering such messages, the second method draws a distinction between where the message was received from. If it is received from one of the filtered ports, then the loop should be broken. If the message is received from a non-prohibited port, i.e. a non-filtered port, the message will still be propagated. This second method has a broad, or general, application since it is possible to still attach a host to a second level expander a broadcast message will be received as expected.

Since the message itself does not include information identifying the source of the broadcast primitive, the source information is provided by way of the inhibit vector or the knowledge of the ports which are part of the filtered port.

This method further refines the broadcast filtering mechanism to advantageously achieve the following criteria:

1. Broadcast primitives/messages received from the filtered phys as defined by BPP_FWD_INHIBIT vector are only sent to the phys that are neither part of the source port, nor part of the filtered phys.
2. Broadcast primitives/messages received from the non-filtered phys as defined by the BPP_FWD_INHIBIT vector are forwarded to all phys that are not port of the source port.
3. Originated broadcast requests are sent to all phys that are not part of the source port.

In other words, in an embodiment the present invention provides a method including: forwarding broadcast messages received from filtered phys to all non-filtered phys that are not part of the source port; forwarding broadcast messages received from non-filtered phys to all phys that are not part of the source port; and forwarding originated broadcast requests to all phys that are not part of the source port.

When implemented as a device, in an embodiment, a filtered broadcast message processor can include: means to forward broadcast messages received from filtered phys to all non-filtered phys that are not part of the source port; means to forward broadcast messages received from non-filtered phys to all phys that are not part of the source port; and means to forward originated broadcast requests to all phys that are not part of the source port.

Referring to FIG. 8, steps 801 to 803 are the same as the processing steps 701 to 703 in the method of FIG. 7. At step 804, the FBPP checks if the BPP request is a received request or originated requests and branches to 805 or 806 conditionally. Step 805 does further checking to see if the received broadcast request is coming from a filtered phy. Only when the type of request is "received request" and the source phy is part of the filtered phys defined by BPP_FWD_INHIBIT then step 807 is executed, otherwise 808 is executed. Step 807 masks off BPP_FWD_INHIBIT from TGT_PHY_MAP to calculate the filtered destination map in D_PHY_MAP. Step 808 simply assigns TGT_PHY_MAP to D_PHY_MAP since no masking is needed. Finally, step 809 sends the BPP transmit indications to all the phys defined by D_PHY_MAP and completes the processing at step 810.

Figure 9:
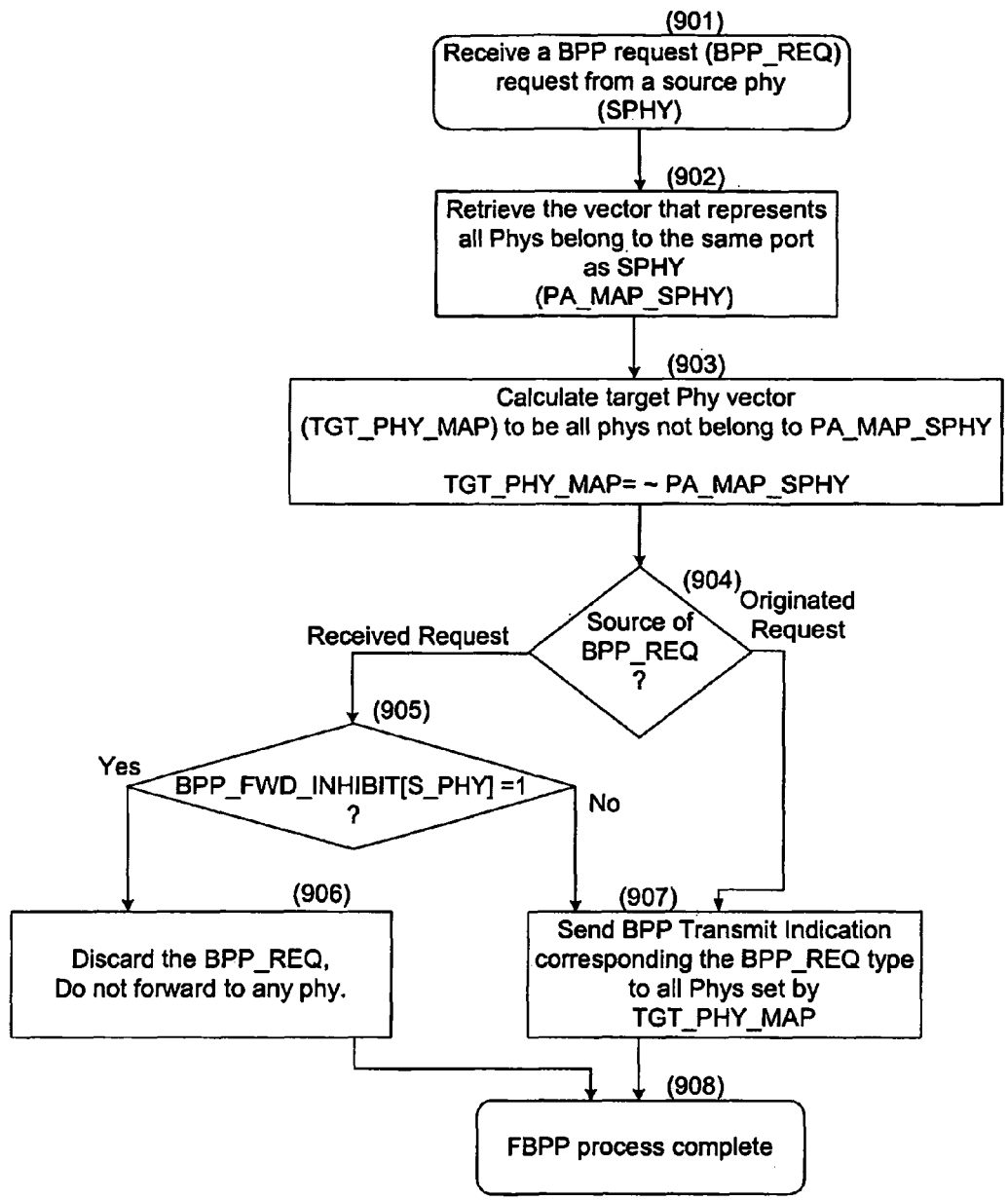
FIG. 9 is a flowchart illustrating a third method according to an embodiment of the present invention.

FIG. 9 illustrates the processing flow for a third method according to an embodiment of the present invention. In this third method, originated messages are always propagated. Broadcast primitives received from a phy with a BPP inhibit bit set to one are not forwarded to any phy. This means that any broadcast primitives that are received from a phy in the filtered ports are not forwarded. The main difference between the third method and the second method is whether the message received from the filtered port is propagated at all. In the third method, broadcast messages from the filtered phys are only sent to the phys that are neither part of the source port nor part of the filtered phys. Therefore, a message received from a filtered phy still propagates to destinations in the blade but is not forwarded on to other domains. That behaviour is part of the second method. In the third method, a broadcast primitive received on a filtered port is not propagated at all. In other words, according to the third method, if you drop a message at a filtered port, you reduce the broadcast messages, but that means that a host can no longer be attached downstream from the filtered port.

The method advantageously achieves the following filtering criteria:

1. Broadcast primitives/messages received from a PHY with BPP_FWD_INHIBIT bit set to 0 are sent to all phys that are not part the source port.
2. Broadcast primitives/messages received from a PHY with BPP_FWD_INHIBIT bit set to 1 are not forwarded to any phy.
3. Broadcast primitives/messages originated from any PHY with BPP_FWD_INHIBIT bit set to either 0 or 1 are forwarded to all phys that are not part the source port.

Referring to FIG. 9, as shown in step 901, the FBPP processing starts by receiving a BPP request (BPP_REQ) from a specific source phy (SPHY). At step 902, the FBPP fetches a PA_MAP_SPHY vector from the expander ECM function. Assuming the expander has N ports, this vector preferably comprises the N-wide bitmap for the wide port membership of the SPHY. All the phys belonging to the same wide port as SPHY, including SPHY itself, have the corresponding bit in PA_MAP_SPHY set to 1; other bits in the PA_MAP_SPHY are set to 0. Step 903 calculates the target phy bitmap TGT filtered PHY_MAP. This bitmap represents the entire set of intended target phys prior to broadcast filtering. The TGT_PHY_MAP equals to the inverse of PA_MAP_SPHY vector.

Step 904 takes a branch according to Source of BPP_REQ. If the BPP_REQ is a "Received request", then step 905 is executed; otherwise, step 907 is executed. In step 905, the FBPP does another test to check if the source phy (SPHY) has BPP_FWD_INHIBIT set to 1. If the source phy is part of the filtered phy, then FBPP executes step 906; otherwise, the FBPP executes step 907. In step 906, the FBPP discards the broadcast request and does not forward the primitive to any expander phy. At step 907, the FBPP the BPP transmit indication signals to all the phys represented by the TGT_PHY_MAP vector. In either case, processing is completed at step 908.

In other words, an embodiment of the present invention provides a method including: discarding broadcast messages received from filtered phys; forwarding broadcast messages received from non-filtered phys to all phys that are not part of the source port; and forwarding originated broadcast requests to all phys that are not part of the source port.

When implemented as a device, in an embodiment, a filtered broadcast message processor can include: means to discard broadcast messages received from filtered phys; means to forward broadcast messages received from non-filtered phys to all phys that are not part of the source port; and means to forward originated broadcast requests to all phys that are not part of the source port.

Also, in another embodiment, the present invention provide a method including: determining a source phy map vector identifying phys belonging to the same wide port as a source phy; generating a target phy map vector identifying target phys by taking the inverse of the source phy map vector; generating a destination phy map vector identifying broadcast destination phys after filtering; and selectively forwarding the broadcast message to each phy in the destination phy map.

The step of generating the destination phy map vector can include, in response to an originated broadcast message, setting the destination phy map vector to be the same as the target phy map vector. The step of generating the destination phy map vector can include, in response to a received broadcast message, determining the destination phy map vector based on a masking of the target phy map vector with an identification of the filtered phys.

When implemented as a device, in an embodiment the device can include: a source phy map vector identifying phys belonging to the same wide port as a source phy; a target phy map vector identifying target phys, the target phy map vector being the inverse of the source phy map vector; and a destination phy map vector identifying broadcast destination phys after filtering. In response to an originated broadcast message, the destination phy map vector can be set to be the same as the target phy map vector. In response to a received broadcast message, the destination phy map vector can be determined based on a masking of the target phy map vector with an identification of the filtered phys.

Figure 10:
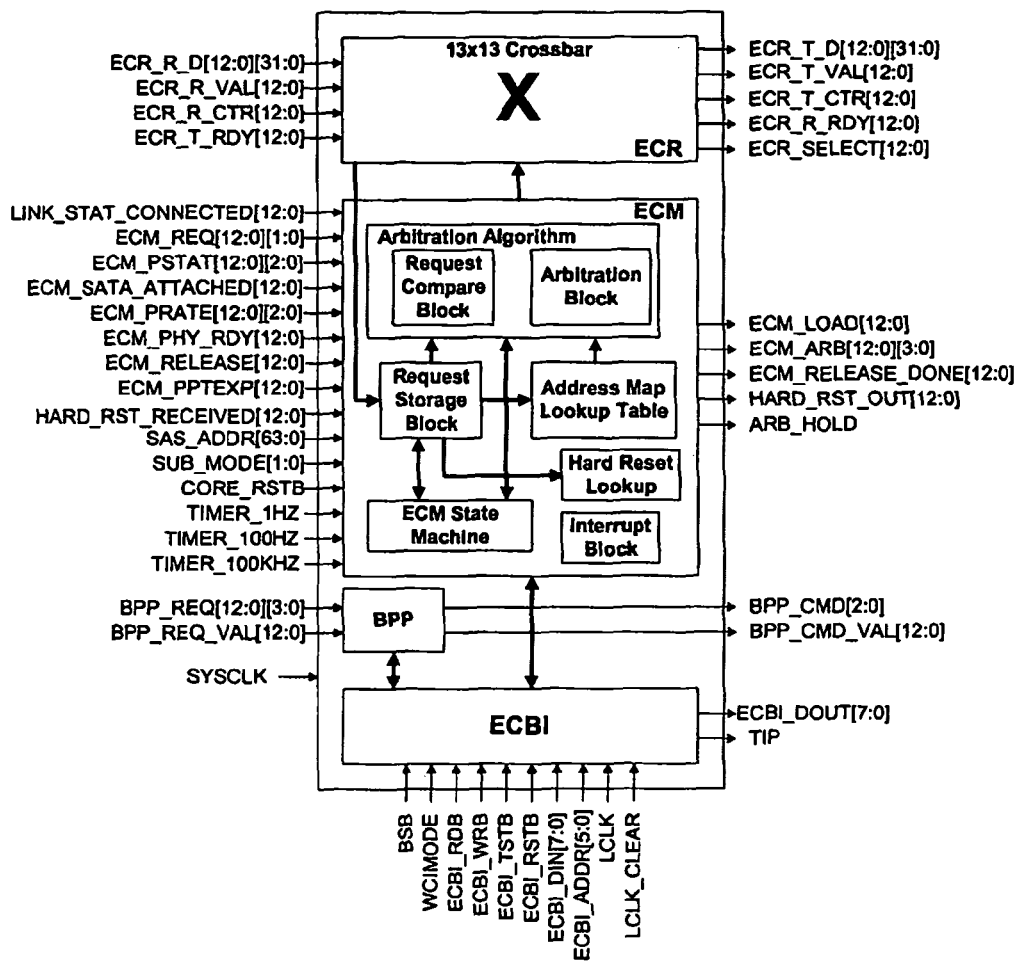
FIG. 10 is a filtered broadcast primitive processor according to an embodiment of the present invention.

The present invention can preferably be implemented in hardware, such as an Application Specific Standard Integrated Circuit Product (ASSP). FIG. 10 illustrates a device for selective broadcast message transmission, or filtered broadcast primitive processor, according to an embodiment of the present invention. The FBPP function can preferably be implemented in a functional block, which incorporates the functionality of Expander Connection Manager (ECM), Expander Connection Router (ECR) and Broadcast Primitive Processor (BPP). The FBPP function described in accordance with embodiments of the present invention can be implemented in the BPP sub block of ECMR shown in FIG. 10. An alternative embodiment of the present invention can be provided as an apparatus, such as the one described in FIG. 4, comprising a Filtered Broadcast Processor and a Filtered Broadcast Configuration.

In FIG. 10, the configuration registers are most likely stored in the ECBI. The BPP in FIG. 10 is actually the FBPP as described earlier, or the filtered broadcast message processor. The FBPP filtering configuration register, or inhibit vector, can be stored in the ECBI of FIG. 10 or in the FBPP block of FIG. 10.

In one implementation, the FBPP method can be implemented in logic gates using ASIC technology. But it should be noted that the same algorithm could alternatively be implemented using other means of realization such as using a combination of software and hardware. One possible implementation utilizes programmable logic devices such FPGA to implement the FBPP logic. Other implementations include the use of software/firmware running on a microprocessor or a programmable engine to realize the processing flow described by this invention. Products and devices can also implement the invention mechanism in an ECMR_LT block.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A device comprising:
a traffic discriminator configured to determine whether received traffic in a serially attached SCSI (SAS) topology, having a closed loop path and including a plurality of expander phys (physical layers) is data traffic or a broadcast primitive, the broadcast primitive identifying only a type of event without any source address, destination address or time to live information;
a filtered broadcast primitive processor configured to forward all the received data traffic in the SAS topology and to selectively send the received broadcast primitive to a subset of the plurality of expander phys in the SAS topology based on knowledge of a location of the closed loop path in the SAS topology, the filtered broadcast primitive processor including
    means to forward broadcast primitives received from filtered phys to all non-filtered phys that are not part of a source port;
    means to forward broadcast primitives received from non-filtered phys to all phys that are not part of the source port;
    means to forward originated broadcast primitives to all the phys that are not part of the source port; and
    means to discard the broadcast primitives received from the filtered phys;
a source phy map vector identifying phys belonging to the same wide port as a source phy;
a target phy map vector identifying target phys, the target phy map vector being an inverse of the source phy map vector; and
a destination phy map vector identifying broadcast destination phys after filtering, the destination phy map vector being determined, in response to the received broadcast primitive, based on a masking of the target phy map vector with an identification of the filtered broadcast destination phys.

2. The device of claim 1 wherein the filtered broadcast primitive processor comprises means to selectively send the broadcast primitive based on a set of filtering rules and a configuration status.

3. The device of claim 1 further comprising means to process received broadcast primitives in a different manner than originated broadcast primitives.

4. The device of claim 1 further comprising means to check the broadcast primitive to determine if it was originated internally from a the source phy or was received externally by the source phy.

5. The device of claim 1 further comprising means to process the broadcast primitives received from a filtered phy in a different manner than the broadcast primitives received from a non-filtered phy.

6. The device of claim 1 wherein the filtered broadcast primitive processor comprises an identification of filtered phys and non-filtered phys.

7. The device of claim 6 wherein the identification of the filtered phys and the non-filtered phys is independent of broadcast primitive contents.

8. The device of claim 1 wherein, in response to an originated broadcast primitive, the destination phy map vector is set to be the same as the target phy map vector.

9. The device of claim 1 wherein the device is a serial attached SCSI (SAS) device.

10. A device comprising:
a traffic discriminator configured to determine whether received traffic in a serially attached SCSI (SAS) topology having a closed loop path and including a plurality of expander phys (physical layers) is data traffic or a broadcast primitive, the broadcast primitive identifying only a type of event without any source address, destination address or time to live information;
a filtered broadcast message processor configured to forward all received data traffic in the SAS topology and to selectively send received the broadcast primitive to a subset of the plurality of expander phys in the SAS topology based on knowledge of the location of the closed loop path in the SAS topology, the filtered broadcast message processor including
    means to forward broadcast primitives received from filtered phys to all non-filtered phys that are not part of a source port;
    means to forward broadcast primitives received from non-filtered phys to all phys that are not part of the source port;
    means to forward originated broadcast primitives to all the phys that are not part of the source port; and
    means to discard the broadcast primitives received from the filtered phys;
a source phy map vector identifying phys belonging to the same wide port as a source phy;
a target phy map vector identifying target phys, the target phy map vector being an inverse of the source phy map vector;
a destination phy map vector identifying broadcast destination phys after filtering, the destination phy map vector being determined, in response to the received broadcast primitive, based on a masking of the target phy map vector with an identification of the filtered broadcast destination phys; and
a mask register to store the identification of the filtered phys,
wherein the mask register comprises an N bit vector, where N is the number of expander phys.

11. A device comprising:
a traffic discriminator configured to determine whether received traffic in a serially attached SCSI (SAS) topology having a closed loop path and including a plurality of expander phys (physical layers) is data traffic or a broadcast primitive, the broadcast primitive identifying only a type of event without any source address, destination address or time to live information; and
a filtered broadcast message processor to forward all received data traffic in the SAS topology and to selectively send received the broadcast primitive to a subset of the plurality of expander phys in the SAS topology based on knowledge of the location of the closed loop path in the SAS topology, the filtered broadcast message processor including
    means to forward broadcast primitives received from filtered phys to all non-filtered phys that are not part of a source port;
    means to forward broadcast primitives received from non-filtered phys to all phys that are not part of the source port;
    means to forward originated broadcast primitives to all the phys that are not part of the source port; and
    means to discard the broadcast primitives received from the filtered phys;
a source phy map vector identifying phys belonging to the same wide port as a source phy;
a target phy map vector identifying target phys, the target phy map vector being an inverse of the source phy map vector; and a destination phy map vector identifying broadcast destination phys after filtering, the destination phy map vector being determined, in response to the received broadcast primitive, based on a masking of the target phy map vector with an identification of the filtered broadcast destination phys;

wherein the filtered broadcast message processor includes a filtered broadcast primitive processor interface to maintain standard request and indication interfaces with expander phys.

12. A method comprising:

determining whether a broadcast primitive a serially attached SCSI (SAS) topology, having a closed loop path and including a plurality of expander phys (physical layers) is a received broadcast primitive or an originated broadcast primitive, the broadcast primitive identifying only a type of event without any source address, destination address or time to live information; and selectively forwarding the received broadcast primitive to a subset of the plurality of expander phys in the SAS topology based on the determination of broadcast primitive type, including forwarding broadcast primitives received from filtered phys to all non-filtered phys that are not part of a source port;

forwarding broadcast primitives received from non-filtered phys to all phys that are not part of the source port;

forwarding originated broadcast primitives to all the phys that are not part of the source port; and discarding the broadcast primitives received from the filtered phys;

determining a source phy map vector identifying phys belonging to the same wide port as a source phy;

generating a target phy map vector identifying target phys by taking an inverse of the source phy map vector; and generating a destination phy map vector identifying broadcast destination phys after filtering, in response to the received broadcast primitive, based on a masking of the target phy map vector with an identification of the filtered broadcast destination phys.

13. The method of claim 12 wherein the broadcast primitive is transmitted by the source phy.

14. The method of claim 12 wherein the step of determining includes checking the broadcast primitive to determine if it was originated internally from the source phy or was received externally by the source phy.

15. The method of claim 12 wherein the step of selectively forwarding is based on a set of filtering rules and a configuration status.

16. The method of claim 12 wherein the step of selectively forwarding comprises processing the broadcast primitives received from a filtered phy in a different manner than the broadcast primitives received from a non-filtered phy.

17. The method of claim 12 wherein the step of generating the destination phy map vector comprises, in response to the originated broadcast primitive, setting the destination phy map vector to be the same as the target phy map vector.

* * * * *

UNITED STATES PATENT AND TRADEMARK OFFICE
CERTIFICATE OF CORRECTION

| | |
|---|---|
| PATENT NO. | : 8,089,902 B1 |
| APPLICATION NO. | : 11/326508 |
| DATED | : January 3, 2012 |
| INVENTOR(S) | : Heng Liao et al. |

It is certified that error appears in the above-identified patent and that said Letters Patent is hereby corrected as shown below:

Column 12, line 30, delete "port" and insert therefor -- part --;

Column 15, claim 4, line 47, delete "a the" and insert therefor -- the --.

Signed and Sealed this
Third Day of April, 2012

David J. Kappos
*Director of the United States Patent and Trademark Office*